(12) United States Patent
Temple

(10) Patent No.: US 8,360,782 B1
(45) Date of Patent: Jan. 29, 2013

(54) FIREFIGHTING TRAINING APPARATUS

(76) Inventor: Rodney G. Temple, Minden, NV (US)

( * ) Notice: Subject to any disclaimer, the term of this patent is extended or adjusted under 35 U.S.C. 154(b) by 640 days.

(21) Appl. No.: 12/586,277

(22) Filed: Sep. 18, 2009

(51) Int. Cl.
*G09B 19/00* (2006.01)

(52) U.S. Cl. ........................................... 434/226

(58) Field of Classification Search .............. 434/72, 434/74, 79, 219, 226; 52/64, 66
See application file for complete search history.

(56) References Cited

U.S. PATENT DOCUMENTS

| | | | | |
|---|---|---|---|---|
| 5,152,109 A | * | 10/1992 | Boers | 52/143 |
| 5,173,052 A | * | 12/1992 | Duncan, Jr. | 434/226 |
| 5,752,835 A | * | 5/1998 | Whitmer, Sr. | 434/226 |
| 6,799,975 B1 | * | 10/2004 | Dunn | 434/365 |
| 6,889,473 B2 | * | 5/2005 | Westra | 52/64 |
| 7,901,212 B2 | * | 3/2011 | Quinn et al. | 434/226 |
| 2005/0233289 A1 | * | 10/2005 | Hoglund | 434/226 |
| 2006/0240392 A1 | * | 10/2006 | Clifton | 434/226 |
| 2011/0143324 A1 | * | 6/2011 | Paganini | 434/226 |

OTHER PUBLICATIONS

"Fireblast 451: Live Fire Training Simulators", Aug. 22, 2007 [retrieved online Oct. 11, 2012].*

* cited by examiner

*Primary Examiner* — Kurt Fernstrom
(74) *Attorney, Agent, or Firm* — Lewis and Roca LLP

(57) ABSTRACT

A firefighting training apparatus having a trailer capable of being towed by a vehicle; an elevated platform supported above the trailer and presenting a simulated rooftop; and a raising mechanism, the raising mechanism attached between the elevated platform and the trailer, the raising mechanism supporting the elevated platform at a desired pitch.

8 Claims, 10 Drawing Sheets

FIREFIGHTING TRAINING APPARATUS

FIELD OF THE INVENTION

The present invention relates broadly to firefighting training apparatus. Specifically, the present invention relates to firefighting training related to rooftop applications. More specifically, the present invention relates to an elevated platform upon which firefighters practice rooftop firefighting techniques.

BACKGROUND OF THE INVENTION

Firefighters routinely place themselves in dangerous situations when fighting fires from rooftops of burning structures. Specialized tools and techniques have been developed to aid firefighters in these applications. While many fires present characteristics common to both vertical and horizontal ventilation, vertical ventilation often requires significant safety considerations, specialized tools, knowledge of roof openings, roof construction, roof coverings, and procedures for opening the roof.

While vertical ventilation doesn't in itself extinguish a fire, it provides effective containment of a fire's movement through a structure, and can reduce property damage. Removal of smoke allows more efficient rescue of victims who are overcome by smoke as visibility is improved once smoke is removed. One method of vertical ventilation by which smoke and heat may be removed from a structure is by opening the roof at its highest point, reducing the danger of a backdraft or a flashover and allowing water to be applied down into the structure onto the fire. Vertical ventilation utilizes skills that must be practiced, such as maintaining safety of the firefighters, providing a second egress from the roof, having charged attack and protection lines ready, observing wind direction and intensity, noting dead loads and obstructions on a roof, constantly observing the roof and evaluating roofing materials and the condition of the roof, locating the seat of the fire, cutting large openings, and avoiding roof collapse when the roof is weakened by fire. Pitched roofs are the most difficult rooftops from which firefighters perform vertical ventilation. Pitched roofs are usually supported by wooden rafters, laminated beams, or wooden or steel trusses spanning the shortest distance between bearing walls. In the average home, the space between the roof and the ceiling defines and attic space, which may be vented by louvers under gable end of the roof.

Firefighters are trained carefully on vertical ventilation because of the inherent danger of operating at a distance above the ground. Training is performed on elevated structures, where firefighters practice using tools for operations such as hauling tools up ladders, operating tools safely on rooftops, such as chain saws, rotary saws, stripping tools, pike poles, sledgehammers, rubbish hooks and pickhead axes, cutting openings in a rooftop, lowering firefighters and/or equipment through such openings, and safely extracting people from such openings and evacuating people from rooftops. Typically, such training takes place on a stationary, permanently fixed training structure that is embodied in an elevated platform. Because of size, the construction of such structures is costly, they generally have only one configuration and one slope, and all training activities have to take place at the site of the structure.

There is thus a heartfelt need for a firefighting training apparatus that is portable, compact, easily deployed, and having multiple training features for different firefighting operations such as vertical ventilation, forcible entry, confined space entry, extraction procedures, as well as rooftop safety and safe operation of tools in a rooftop application.

SUMMARY OF THE INVENTION

The present invention solves the problems described above by providing a trailer-based simulated rooftop. In one aspect, the present invention provides a firefighting training apparatus having a trailer capable of being towed by a vehicle; an elevated platform supported above the trailer and presenting a simulated rooftop; and a raising mechanism, the raising mechanism attached between the elevated platform and the trailer, the raising mechanism supporting the elevated platform at a desired pitch. In an embodiment, the desired pitch includes a flat rooftop having no pitch. The elevated platform comprises a plurality of joists supporting a flat surface. In an embodiment, the elevated platform is covered in a roofing material such as wood shingles, roofing felt, clay tile shingles, or composition roofing material. In an embodiment, the firefighting training apparatus includes a secondary elevated platform below the elevated platform in a horizontal orientation, presenting a ceiling structure. A third elevated platform, is also presented in an embodiment, suspended from an edge of the elevated platform in a vertical orientation, presenting a vertical wall structure. The third elevated platform is secured by horizontal supports connected between the bottom of the elevated platform and the third elevated support.

In an embodiment, the raising mechanism includes at least one hydraulic ram or a pneumatic system. In a simplified embodiment, the hydraulic ram or pneumatic system is replaced with a crank assembly.

In an embodiment, the firefighting training apparatus includes at least one outrigger member being a retractable member connected to the trailer in a substantially horizontal orientation and having a foot member, the foot member brought in contact with ground surrounding the trailer when the outrigger member is in an extended orientation.

An important feature of the present invention is that the elevated platform has a surface area larger than the surface area defined by the trailer's length and width. The elevated platform includes two outer members presented opposite of each other to define a substantially rectangular area, each outer member having three segments attached to each other at right angles to present three sides of a rectangle, each outer member having a plurality of joist hangers are aligned with joist hangers connected to another outer member present in opposing relationship. In an embodiment, a safety railing is disposed along the perimeter of the elevated platform.

The present invention is easily adapted to numerous training exercises for rooftop operations. Some of the many exercises include cutting holes in between joists 130, such as a 24 inch by 24 inch aperture for confined space entry and extraction measures, in which a tripod is assembled on platform 102 and people are lowered into the aperture as well as hauled out of the aperture. Ladder placement training is also easily practiced on platform 102 in its various elevations and angles.

In an embodiment, the elevated platform is supported by vertical members having adjustable lengths to simulate different roof pitches. In an embodiment, the raising mechanism also unfolds a support frame on which the elevated platform is assembled for use and folds the support frame for transport.

Another important feature included on the trailer is a door in a door frame for forcible entry training, presented in a vertical orientation. In an embodiment, at least one hinge is included for severing operations. Similarly, in an embodiment, at least one deadbolt secures the door within the doorframe.

An instrument panel displaying information such as raising mechanism pressure information and elevated platform pitch information is included in an embodiment.

Additional features and advantages of the present invention will become apparent to those skilled in the art upon reading the following detailed description, when considered in conjunction with the accompanying drawings, in which:

DETAILED DESCRIPTION

Figure 1:
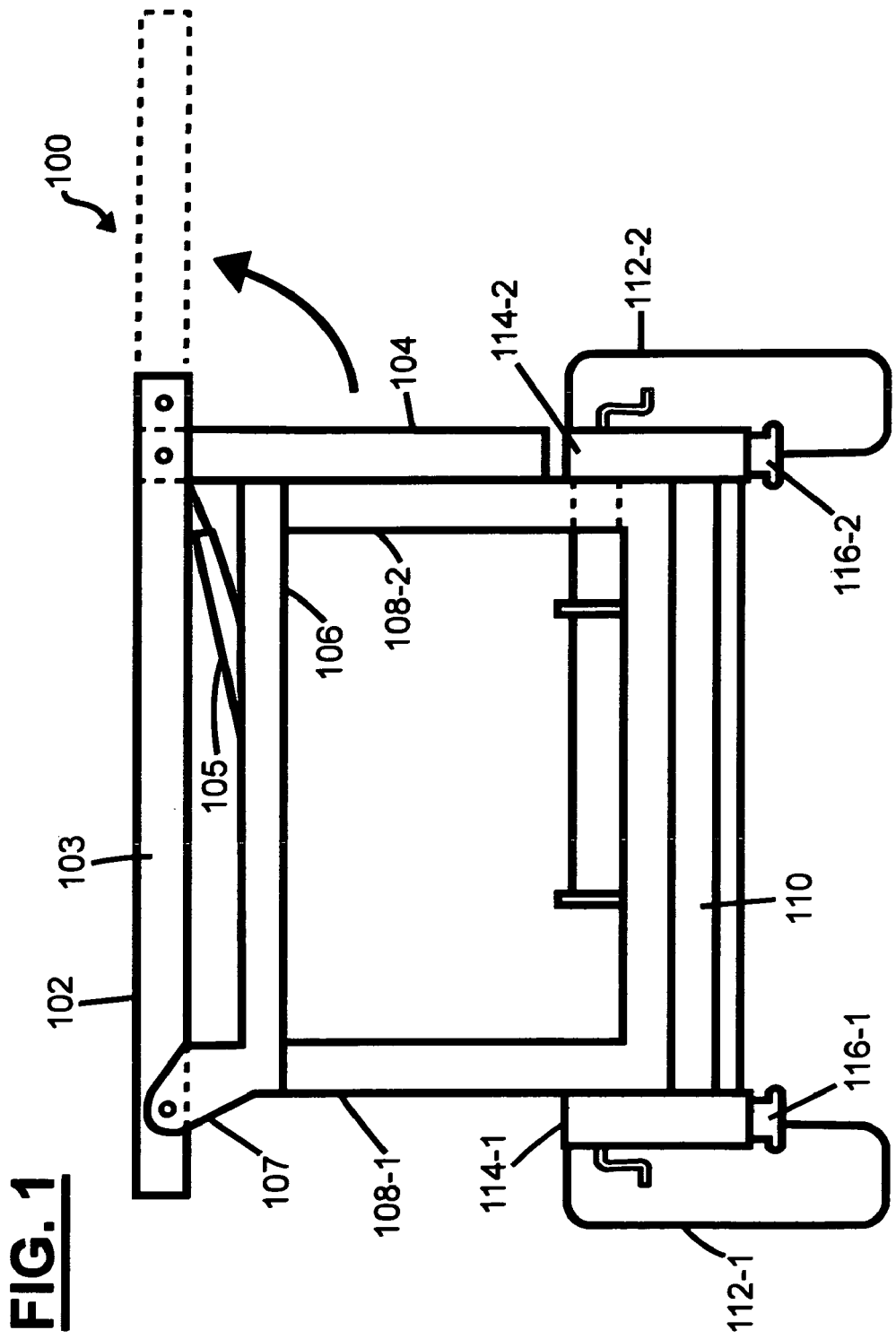
FIG. 1 presents an elevation view of the present invention with the training platform in a retracted position.

Directing attention to FIG. 1, there is shown trailer 100 having a platform 102 in a retracted position. Platform 102 is formed from frame member 103 connected to frame member 104, which pivots from a horizontal orientation to a sloped orientation when assembled for operation. When member 103 and 104 are connected, they define an area larger than the footprint of trailer 100. Ram 105 connects between platform 102 and top member 106. During raising operations, ram 105 extends to drive platform 102 upward against hinge 107 located at the end of frame member 103. In the preferred embodiment, ram 105 is a hydraulic ram located at both ends of platform 102. However, in place of a hydraulic ram, ram 105 can be pneumatic, or replaced by a mechanical crank. The operating height of platform 102 is defined by the height of vertical members 108-1, 108-2. Horizontal frame member 110 provides a base for trailer 100, and also mounting points for wheels 112-1, 112-2. Multiple outrigger members 114 can be incorporated into base member 110, and, in the case of outrigger 114-2, extend outward from trailer 100. Outrigger members 114 deploy feet 116-1, 116-2 downward to contact the ground surrounding trailer 100, thus improving stability of trailer 100 when platform 102 is raised as shown in FIG. 2.

Figure 2:
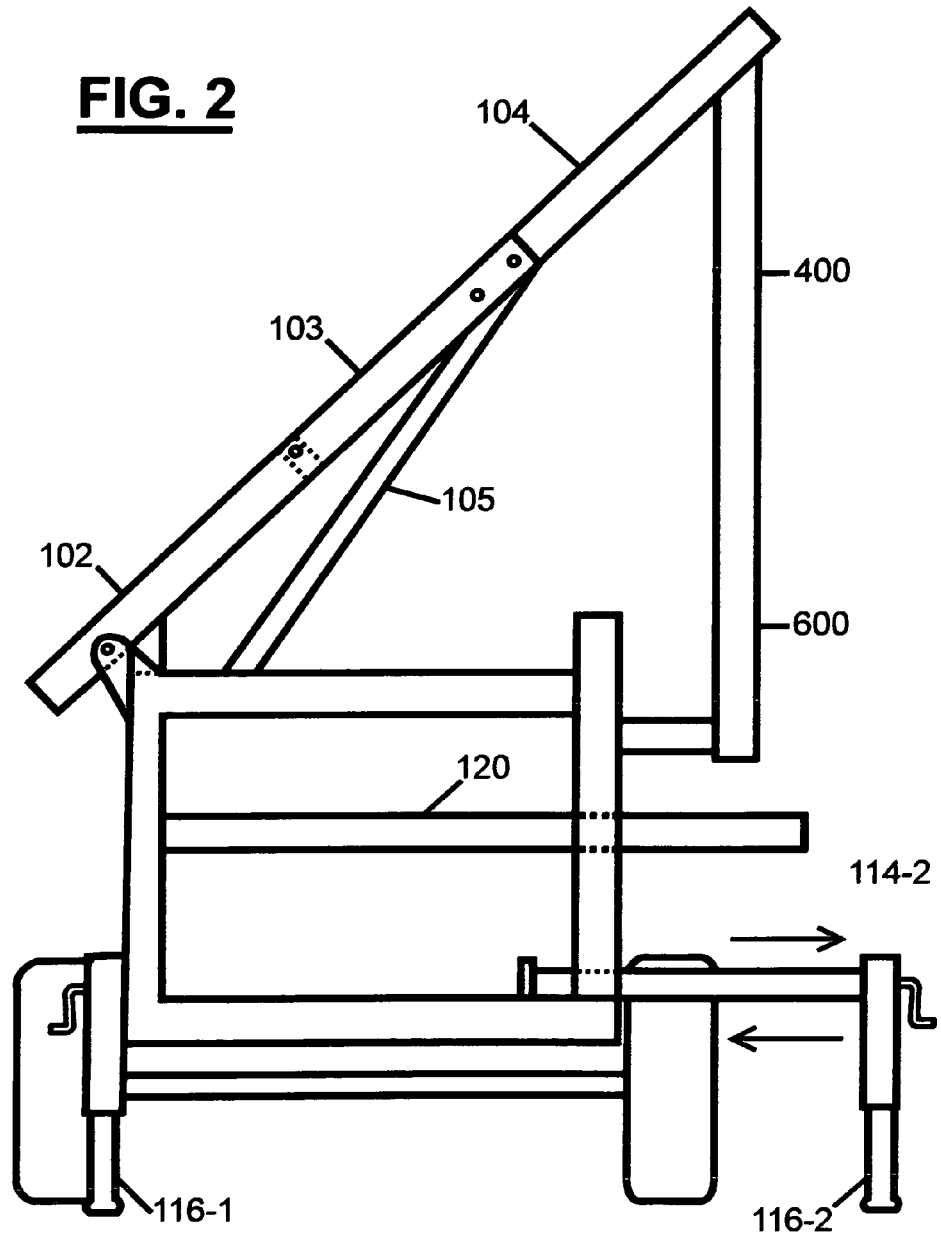
FIG. 2 presents an elevation view of the present invention with the training platform in an elevated position.

Also shown in FIG. 2 is ceiling structure 120. In the preferred embodiment, ceiling structure 120 is a drywall surface disposed horizontally over a frame to present a simulated ceiling structure beneath platform 102. Like platform 102, ceiling structure can have a footprint larger than trailer 100 when it slides out beyond the edge of the trailer.

Figure 3:
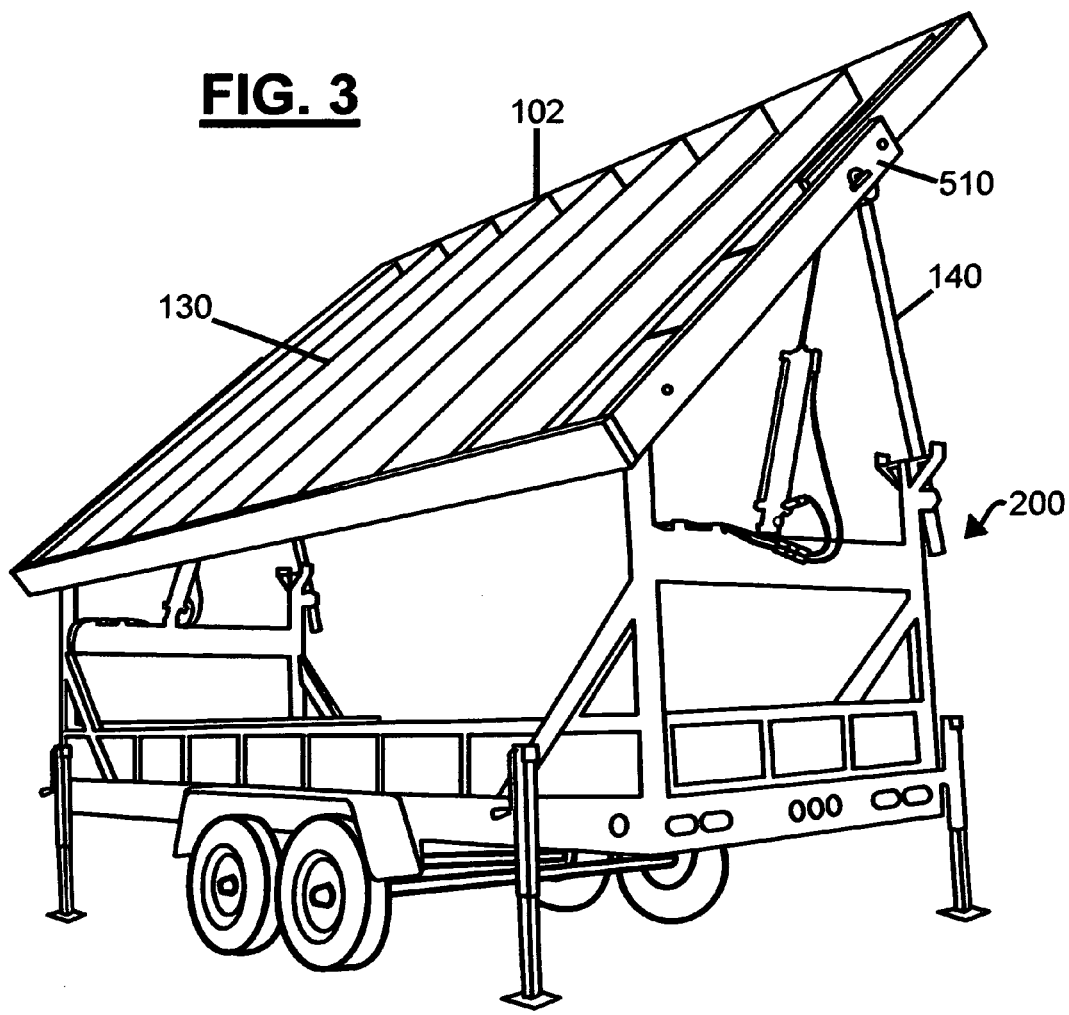
FIG. 3 presents a perspective view of the trailer of the present invention.

FIG. 3 presents trailer 200 in a perspective view. Trailer 200 is similar to trailer 100, but incorporates vertical arms that extend above the top frame member. However, trailer 200 incorporates platform 102, and illustrates it elevated with a plurality of joists 130 spanning the width of platform 102. Joists 130, in operation, are covered typically with plywood sheets and then roofing material such as tar paper, composition shingles, wood shingles, clay shingles, and other suitable roofing materials found in typical outdoor structures. As shown, vertical brace 140 is attached between platform 102 and vertical support member 208.

Figure 4:
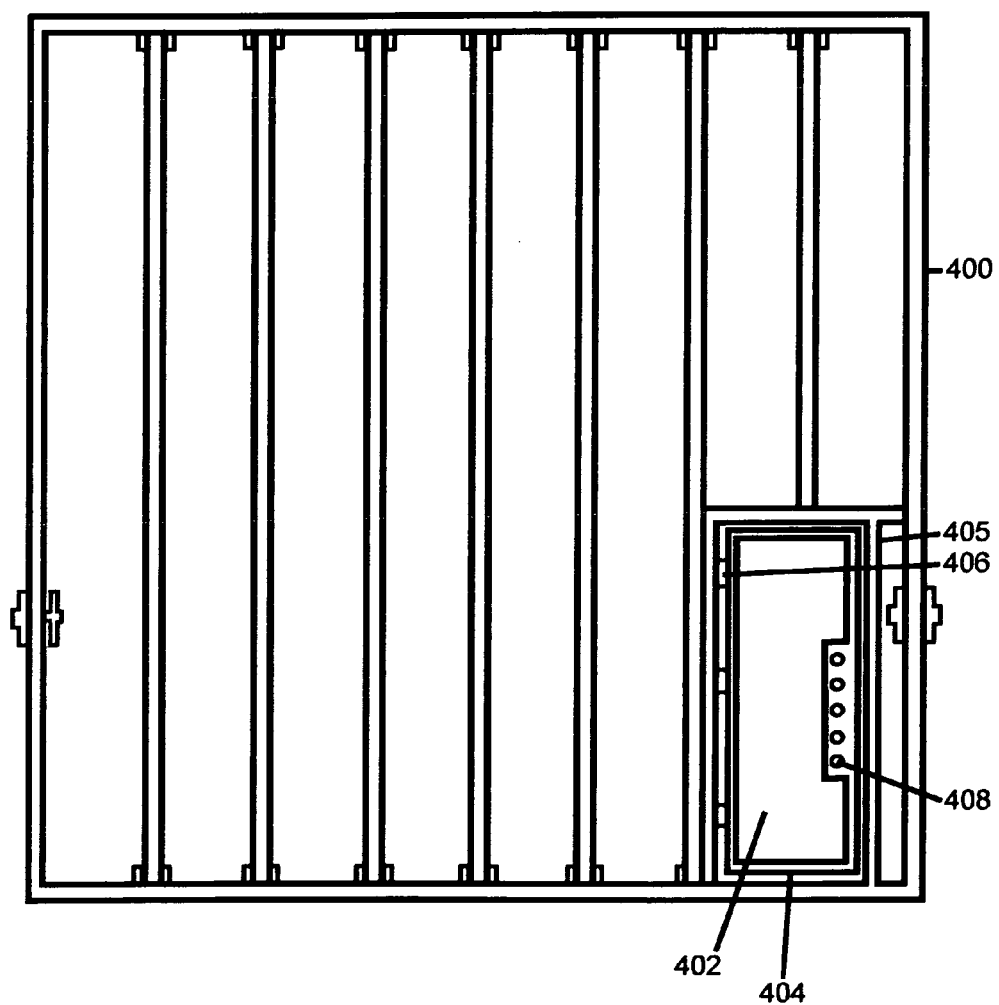
FIG. 4 presents a frame structure for the training platform that can be deployed in a vertical or sloped orientation.

FIG. 4 illustrates frame 400, which can be included as a secondary, vertically disposed training wall. Frame 400, in the preferred embodiment, is suspended from the high end of platform 102 in a vertical orientation, and is then braced horizontally to vertical member 108-2, similar to the plurality of joists 130 found in platform 102.

A vertical wall such as presented by frame 400, when covered with sheeting material such as plywood, can also incorporate consumable material 402 covering door 404 within frame 405. Presenting a door in a frame for training allows a user to practice using tools to cut or otherwise remove hinges 406, or deadbolts 408.

Figure 5:
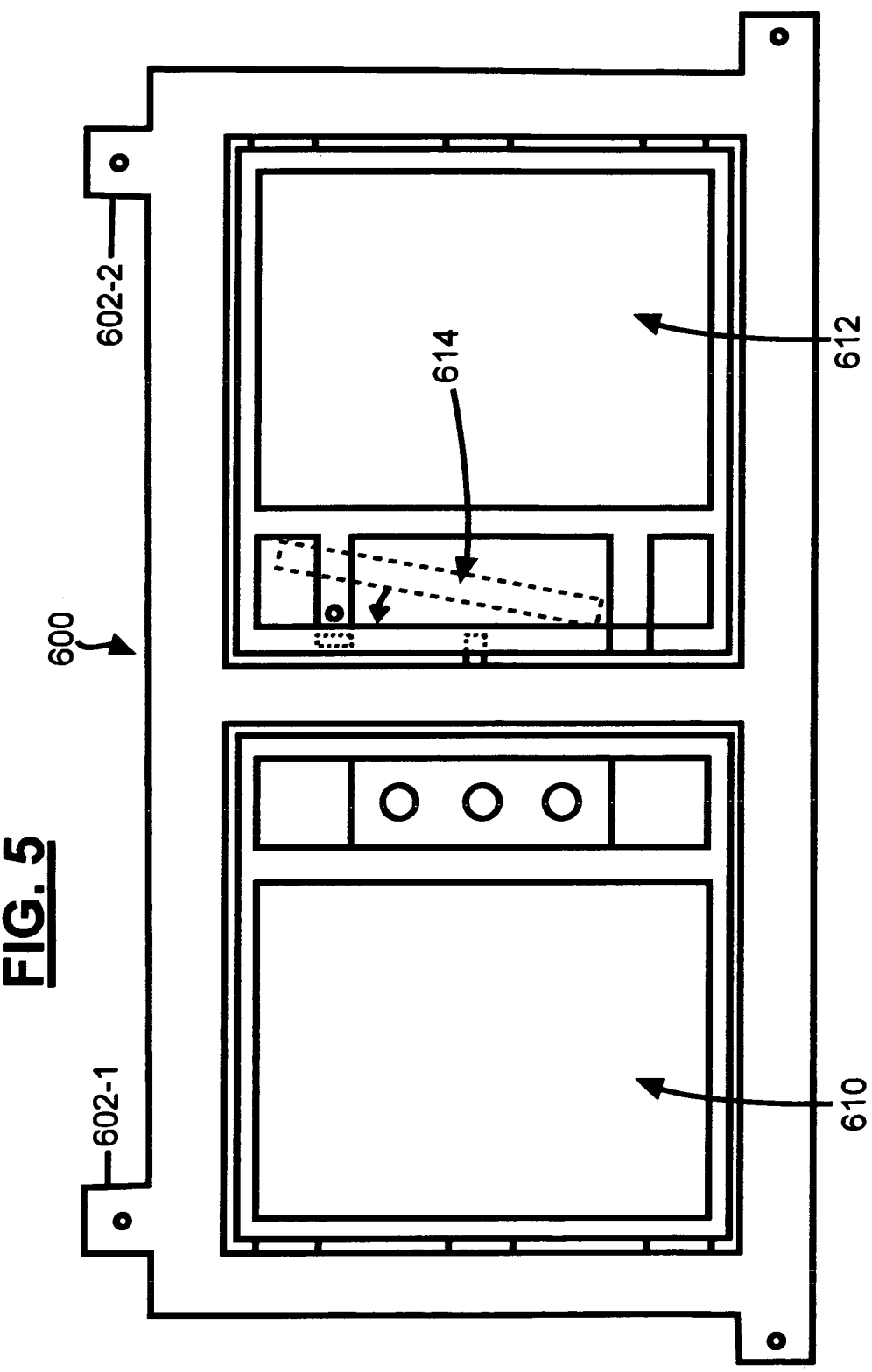
FIG. 5 presents a pair of door-in-a-frame structures for use in a substantially vertical orientation.

FIG. 5 illustrates a pair of door-in-frames 600. Bolt to prop mounting tabs 602-1, 602-2 can be used to suspend door-in frames 600 in a vertical orientation as discussed above with respect to frame 400. By presenting multiple doors, different materials can be used for training using different tools. For example door 610 can have a tubular steel frame, thus requiring through-the-lock operations such as drilling. Door 612 can be made of consumable material such as wood, so that prying operations during forcible entry training can be learned. As shown, frame member 614 can be pried from its vertical orientation to allow entry.

Figure 6:
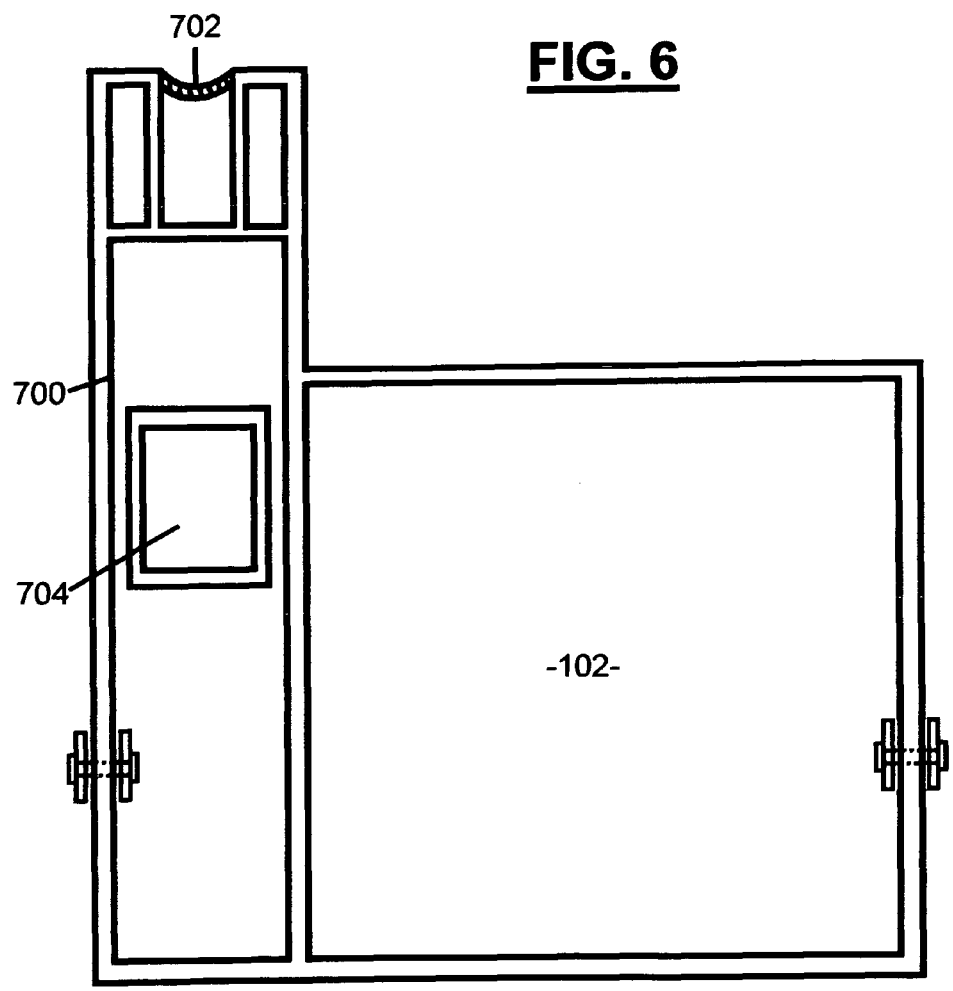
FIG. 6 presents a plan view of a rappelling tower for use with the elevated platform of the present invention.

FIG. 6 illustrates rapelling tower 700 incorporated in platform 102. Rapelling tower 700 can utilize a safety chain 702 at one end, and aperture 704 for confined space entry and extraction exercises from a rooftop application. A safety chain can similarly be implemented along the perimeter of platform 102 to protect users from falling off the edge of platform 102.

Figure 7:
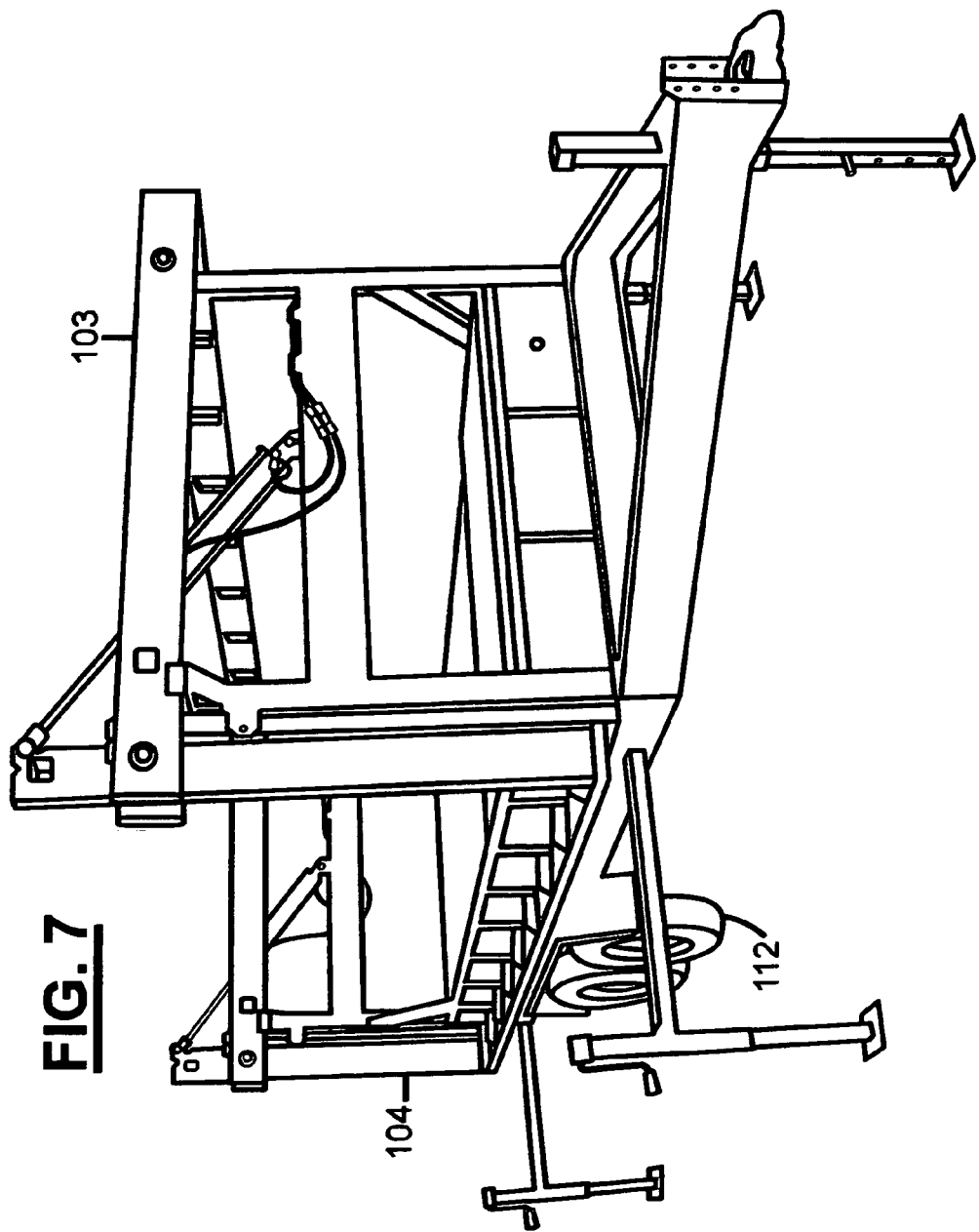
FIG. 7 illustrates the trailer of the present invention folded and secured for transport.

FIG. 7 shows trailer 100 in the transport position. Frame member 103 is in a horizontal and locked position. Frame member 104 is secured in a vertical and locked position.

Figure 8:
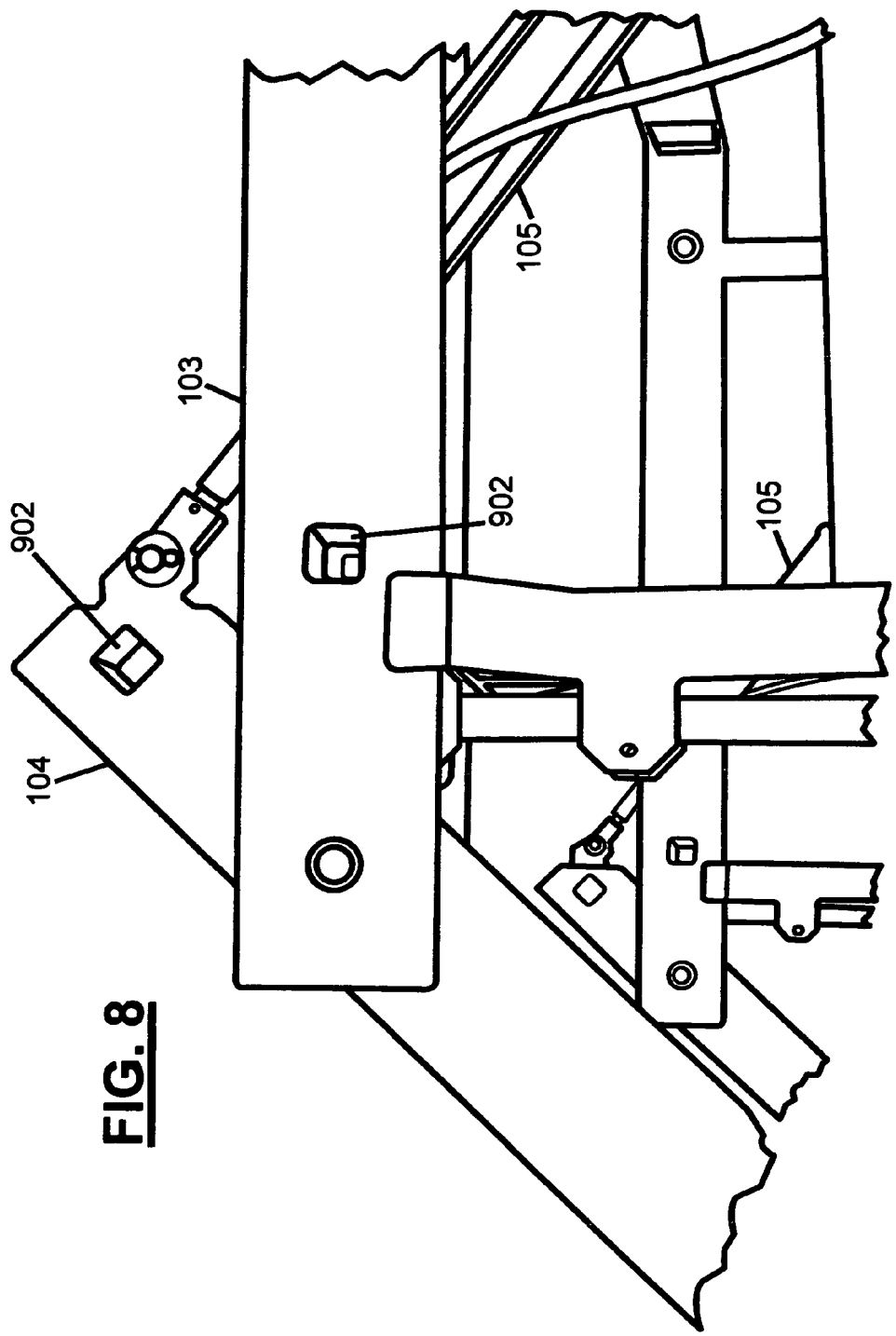
FIG. 8 illustrates the platform of the present invention during pivoting and assembly of the two frame members that make up the frame for the platform.
Figure 9:
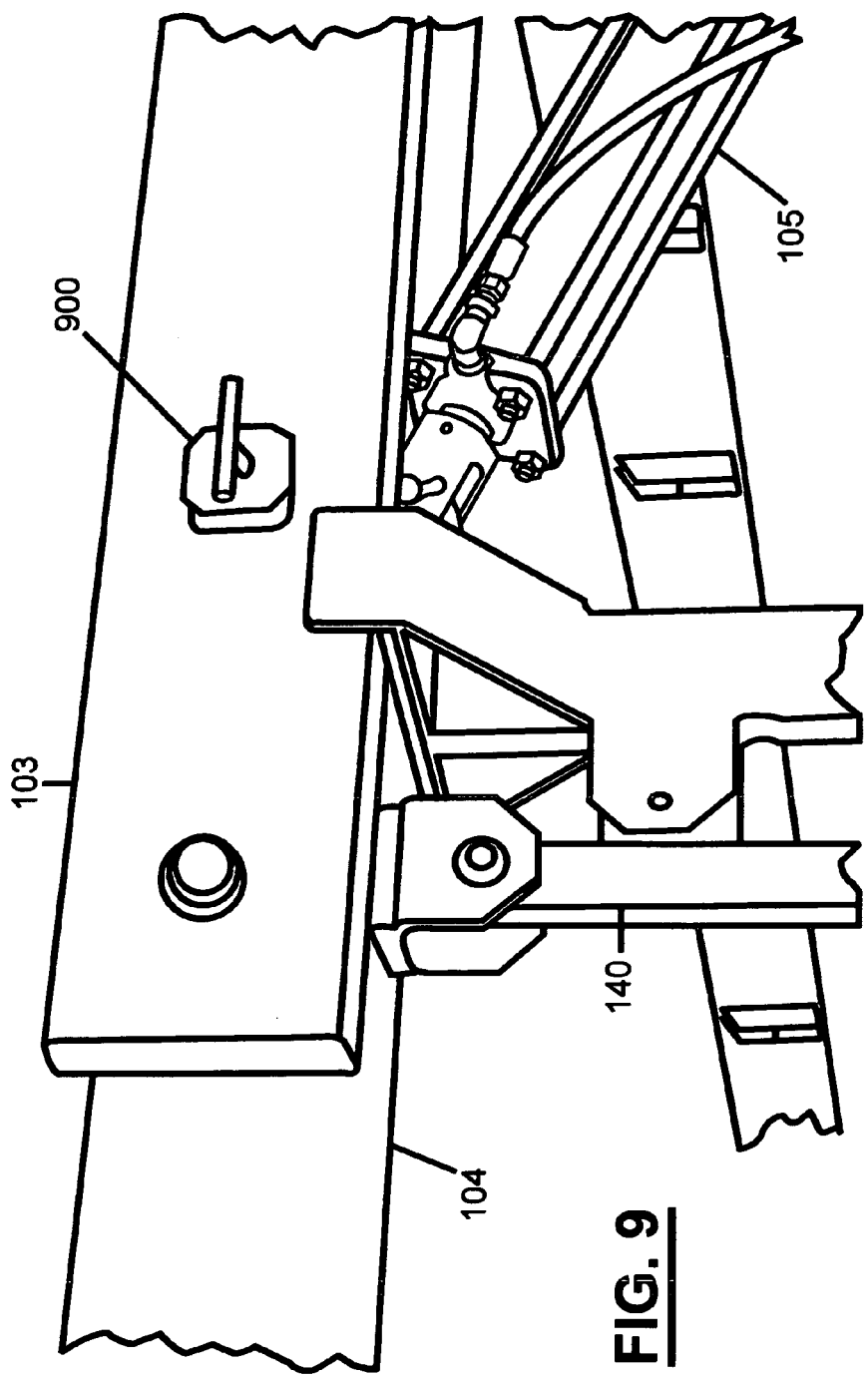
FIG. 9 illustrates the two frame members shown in FIG. 9 in alignment and secured by a locking pin.
Figure 10:
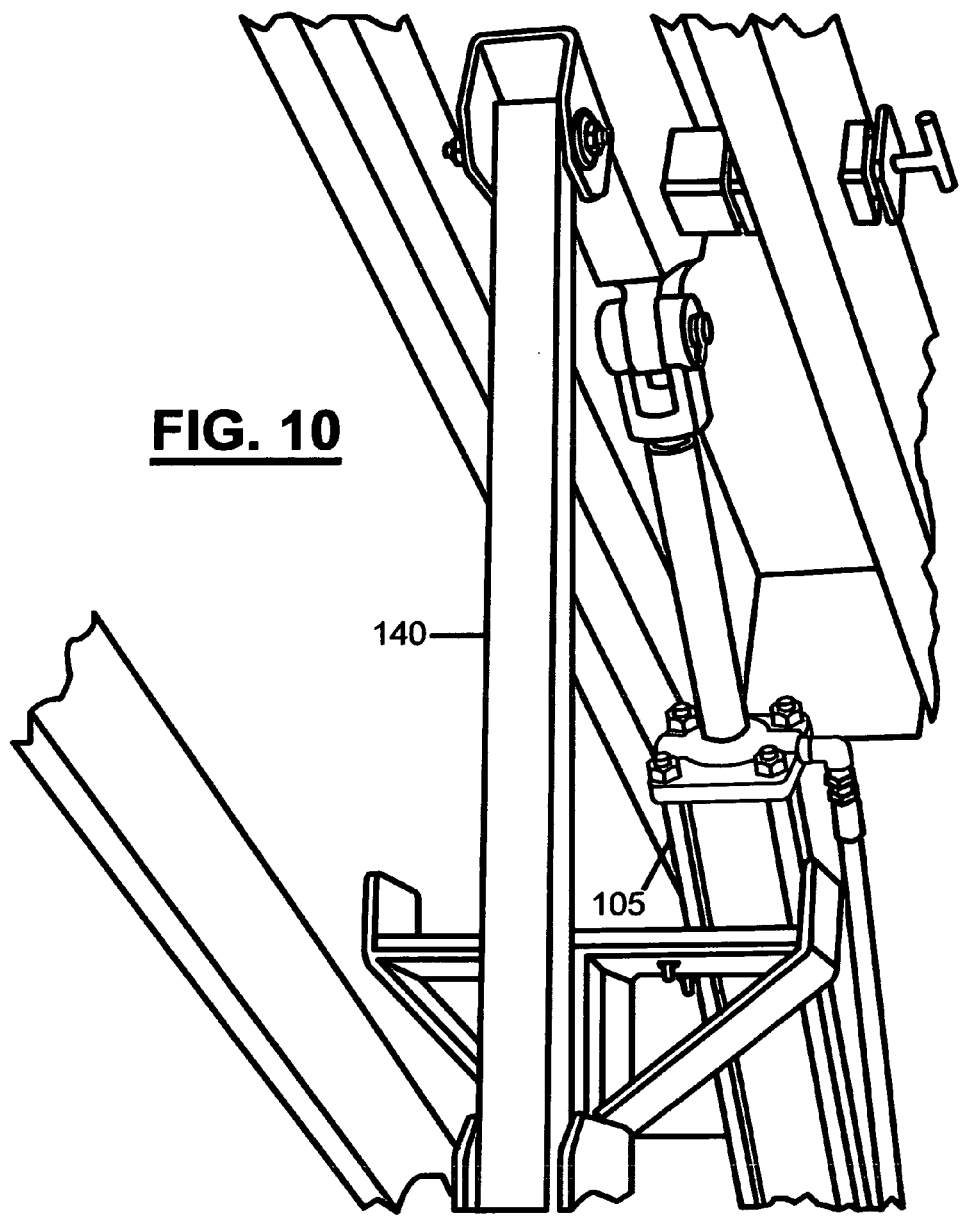
FIG. 10 illustrates a vertical support that locks and secures the platform of the present invention once it is elevated to a desired pitch.

FIG. 8 illustrates the pivoting detail between frame member 103 and frame member 104 Once ram 105 unfolds or pivots frame member 104 to a horizontal orientation, thus aligning it with frame member 104, securing pin 900 is inserted through aperture 902 (FIG. 9), thus connecting frame member 103 and frame member 104 in an aligned position. Ram 105 then continues operation to lift frame member 103 and frame member 104 to a desired elevation and slope, vertical support 140 is locked between frame member 104 and the base of trailer 100 (FIG. 10).

Numerous modifications can be made to the various embodiments of the present invention without departing from the spirit thereof.

What is claimed is:

1. A firefighting training apparatus, comprising:
   a trailer having a length and a width and capable of being towed by a vehicle;
   a first vertical support frame spanning substantially the width of the trailer and mounted proximate to a front end of the trailer;
   a second vertical support frame spanning substantially the width of the trailer and mounted proximate to a rear end of the trailer;
   a working surface support frame having a first section including first and second opposed end members having lengths substantially equal to the width of the trailer and coupled at first ends thereof to a first cross member, the first and second end members pivotally mounted at the first ends, respectively, to top portions of first sides of the first and second vertical support frames to permit the first section of the working surface support frame to be pivoted from a horizontal plane to an inclined plane;

a second section of the working surface support frame including third and fourth opposed end members, the third and fourth end members coupled at first ends thereof to a second cross member, the third and fourth end members pivotally mounted at pivot points proximate to second ends thereof, respectively, to second ends of the first and second opposed end members to permit the second section of the working surface support frame to be pivoted between a deployed position in which the first and second sections are in a single plane and a stowed position in which the second section is disposed in a substantially vertical orientation proximate to the first sides of the first and second vertical support frames; and a raising mechanism coupled between the vertical support frames and the working surface support frame.

2. The firefighting training apparatus of claim 1 further comprising:

a first locking mechanism coupled between the first and third end members and configured to lock the first and third end members when the first and second sections are in the deployed position; and a second locking mechanism coupled between the third and fourth end members and configured to lock the third and fourth end members when the first and second sections are in the deployed position.

3. The firefighting training apparatus of claim 1 wherein sets of opposed joist hangars are disposed on facing inner surfaces of the first and second cross members.

4. The firefighting training apparatus of claim 1 further including brace members coupleable between the first and second vertical support frames and the working surface support frame and configured to support the working surface support frame when the first and second sections are in the deployed position.

5. The firefighting training apparatus of claim 1, wherein the raising mechanism comprises at least one hydraulic ram.

6. The firefighting training apparatus of claim 1, further including an auxiliary working surface frame coupleable to the second cross member and to the first and second vertical support frames.

7. The firefighting training apparatus of claim 1, wherein the first section of the working surface support frame rests on the first and second vertical support frames when it is positioned in the horizontal plane.

8. The firefighting training apparatus of claim 1 wherein the raising mechanism comprises at least one hydraulic ram coupled between one of the vertical support frames and one of the end members of the second section of the working surface support frame at a location between the pivot point and the second end thereof.

* * * * *